E. W. WINNER.
SOIL PULVERIZER.
APPLICATION FILED JULY 20, 1915.
1,219,793.
Patented Mar. 20, 1917.
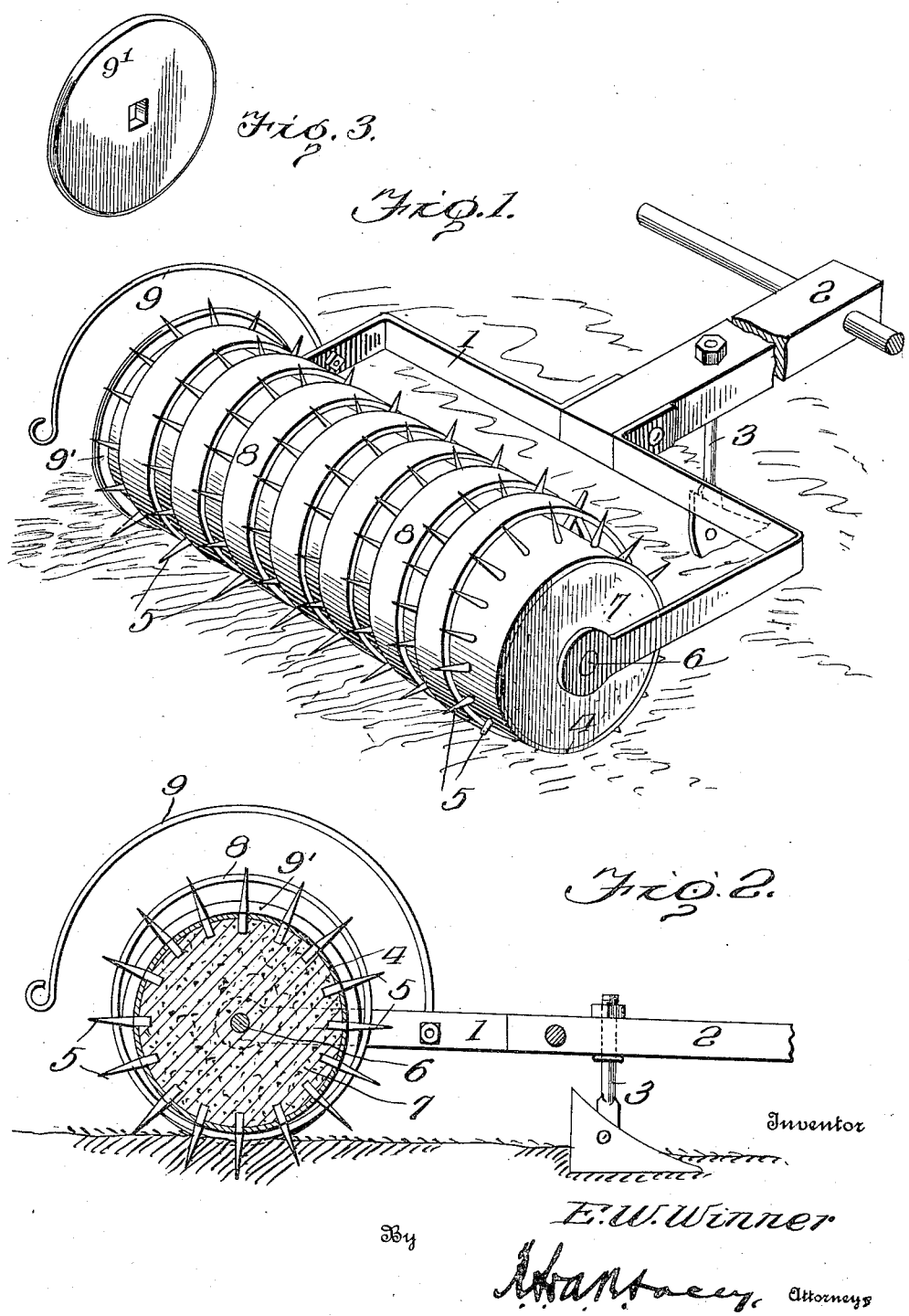
Inventor
E. W. Winner
By
[signature], Attorneys

UNITED STATES PATENT OFFICE.

ERNEST W. WINNER, OF PAOLA, KANSAS.

SOIL-PULVERIZER.

1,219,793.  Specification of Letters Patent.  Patented Mar. 20, 1917.

Application filed July 20, 1915. Serial No. 40,955.

*To all whom it may concern:*

Be it known that I, ERNEST W. WINNER, a citizen of the United States, residing at Paola, in the county of Miami and State of Kansas, have invented certain new and useful Improvements in Soil-Pulverizers, of which the following is a specification.

This invention relates to agricultural implements, and has special reference to soil pulverizers.

The object of the invention is to provide a simple and inexpensive apparatus by the use of which the soil may be pulverized and left in a fine condition so as to facilitate the growth of plants and in which the large clods or stalks and leaves which may be taken up by the pulverizing members will be removed from the apparatus automatically during the travel of the same.

The invention is illustrated in the accompanying drawings, and will be hereinafter fully described, the novel features being particularly pointed out in the claims following the description.

In the drawings:—

Figure 1 is a perspective view of an implement embodying my improvements;

Fig. 2 is a view, partly in section and partly in transverse section of the same;

Fig. 3 is a detached perspective view of the runner cutter.

In the form of the invention illustrated in Figs. 1 and 2, there is employed a yoke or a pair of brackets 1 secured to a draft bar or pole 2 to which draft animals may be attached or which may be drawn over the field manually. To the draft pole 2 I secure a small plow or furrow opener 3, which is adapted to mark a furrow line and also to cut through any stalks which may be in the path of the device so that rank growth will be eliminated.

In carrying out my invention, I may employ a sheet metal cylinder 4 which is perforated at intervals throughout its surface and through the perforations of which I insert teeth or spikes 5. A bar 6 is inserted axially through the cylinder which is then filled with cement 7 so that, when the cement has set, the teeth will be firmly secured and an axle will be provided for the roller thus formed. The ends of the axle are journaled in the ends of the brackets or yoke 1, as shown in Fig. 1. I also employ a plurality of clearing bands 8 which are greater in diameter than the cylinder but are of lesser diameter than the circle described by the points of the teeth. These bands should be of sufficient width to fit closely between the several annular rows of teeth but, at the same time, sufficiently free of the teeth to roll freely over the ground as the cylinder or roller travels.

The use of the device, it is thought, will be readily understood. By means of draft applied to the pole 2, the device is drawn or pushed over the ground and the teeth 5 will obviously take into and break up the hard surface so that the soil will be loosened and divided into a fine bed. Any trash, weeds or large clods which may tend to cling to the teeth will be removed therefrom by the clearing bands 8. It will be noted, upon reference to Fig. 2, that these bands rest upon the surface of the ground between the same and the lowest point of the roller. As the roller moves over the surface, the clearing bands or hoops will, of course, be carried along in the same direction, but as the said bands or hoops are of greater diameter than the roller they will gradually approach the points of the teeth so that any substance which may be clinging to the teeth will be pushed therefrom and dropped to the ground. The weight of the roller is such that it and the clearing bands will bear directly upon the ground and press down all ridges in its path so as to leave the surface smooth and even. As the teeth will take into the ground and break up the same without turning over the surface soil, deep furrows will not be formed but the soil will be left in a finely pulverized condition so that moisture will reach the roots of the plants to nourish the same. The machine is especially useful in preparing the ground for planting as the soil will be left in a fine bed to receive the seed and will not be compressed into a hard mass. The roller may be of any desired size so that it will cover the entire space between two rows of plants and will serve the purposes of a cultivator and of a hoe.

In Figs. 1 and 2, I have shown a leaf clearer or guard 9 adapted to push back the plants adjacent which the implement is being drawn over the ground. A runner cutter 9′ may also be used. This runner cutter is a circular disk of steel, having its edge sharpened, which is fitted on the axle adjacent the end of the cylinder or the roller and, as the device is moved over the field, cuts through and trims off all vines or runners which sprout from the plants. The cutter may, of course, be mounted at either end or both ends of the roller or cylinder.

The device is exceedingly simple in its construction and arrangement of its parts and may be produced at a low cost. It has been found highly efficient in practice so that a large field can be successfully cultivated in an economical and expeditious manner.

Having thus described the invention, what is claimed as new is:—

1. An apparatus of the class described comprising a roller having radial teeth, a cutting disk rotative with said roller and projecting in advance of the periphery thereof, and a vine fender located above the cutting disk and spaced therefrom.

2. In an apparatus of the class described, a supporting frame, a carrier shaft mounted for rotation on said frame, a drum carried by said shaft and having radial teeth, a cutting disk rotative with said roller and projecting in advance of the periphery thereof, and a vine fender connected to said frame and extending above the cutting disk and spaced therefrom.

In testimony whereof I affix my signature.

ERNEST W. WINNER. [L. S.]

Copies of this patent may be obtained for five cents each, by addressing the "Commissioner of Patents, Washington, D. C."